Jan. 22, 1963  J. S. NEWTON  3,074,288
DRIVE PULLEY
Filed May 9, 1961 2 Sheets-Sheet 1
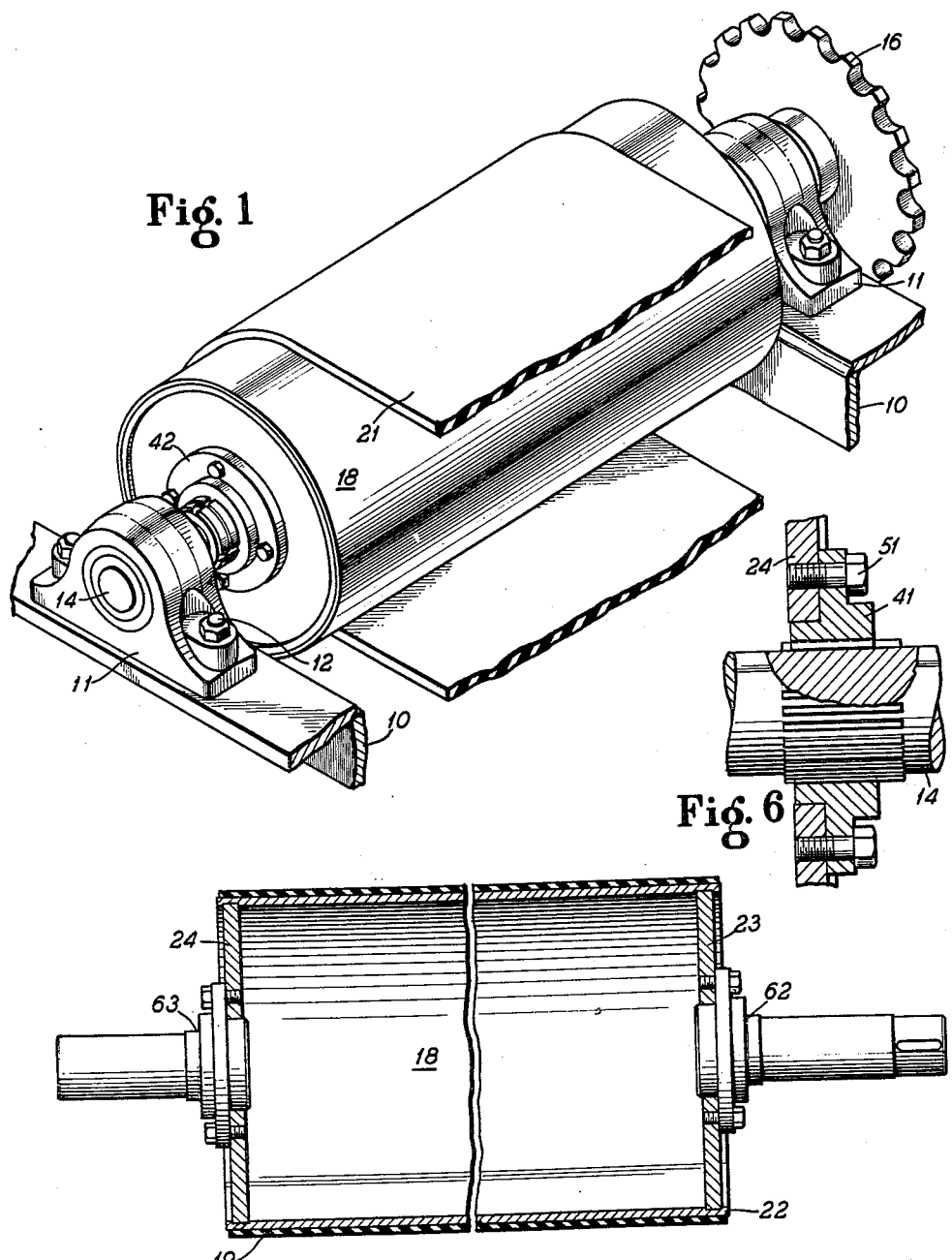
INVENTOR.
John S. Newton
BY Murray A. Gleeson
ATTORNEY

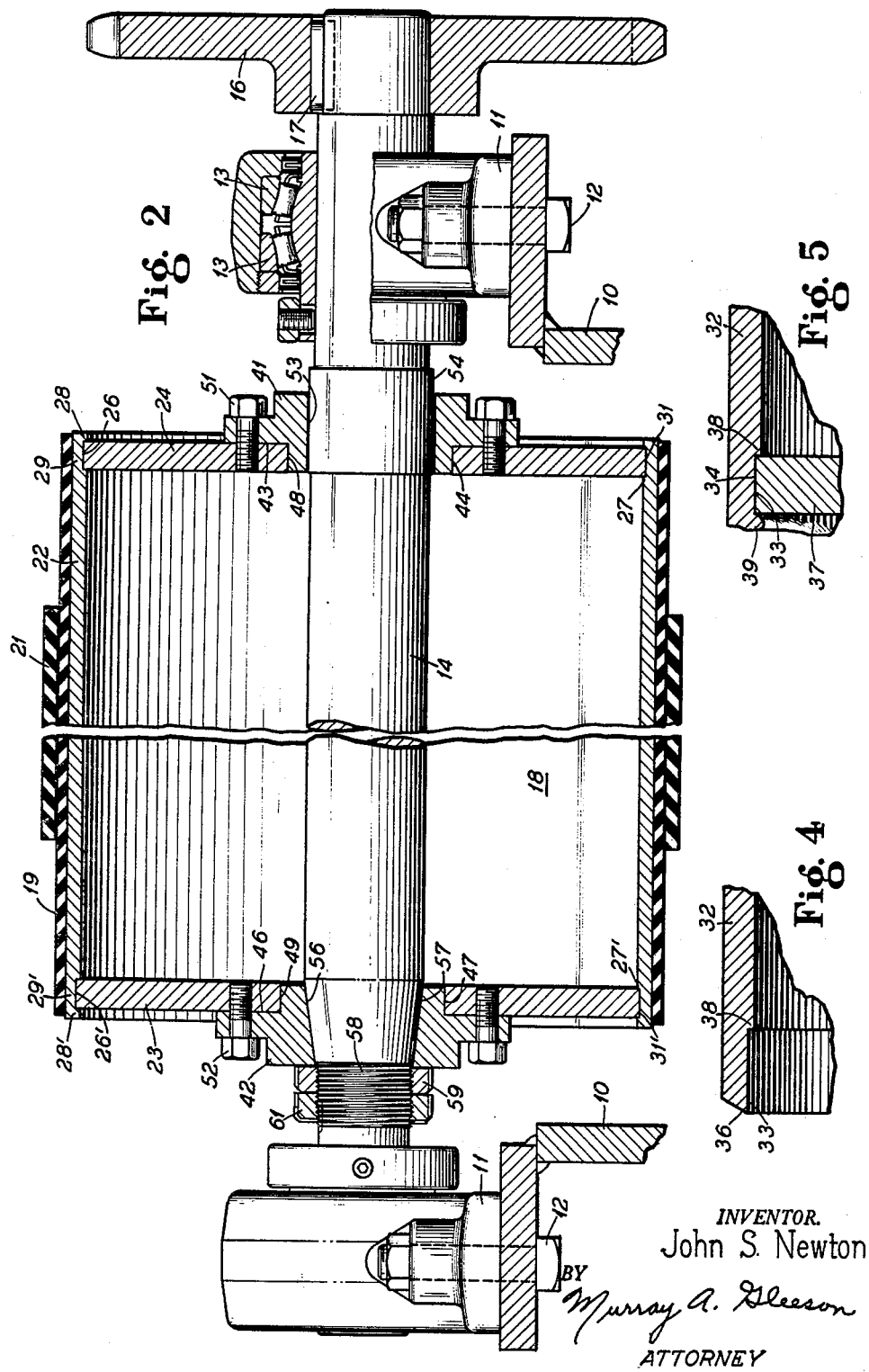

United States Patent Office 3,074,288
Patented Jan. 22, 1963

3,074,288
DRIVE PULLEY
John S. Newton, Glen Ellyn, Ill., assignor to Goodman Manufacturing Company, Chicago, Ill., a corporation of Illinois
Filed May 9, 1961, Ser. No. 108,905
8 Claims. (Cl. 74—230.3)

This invention relates to pulleys for belt conveyors and the like and more particularly to an improved construction of pulley body.

In producing conveyor pulleys, it has been customary to split a length of tubular stock along one side, insert end members in each end, and weld the parts together to form a unitary cylindrical pulley body. Since the weld metal was rarely distributed uniformly about the rotational axis of the pulley body, an unbalanced structure resulted. With increased conveyor speeds these unbalanced pulley bodies introduced problems of vibration and fatigue in the bearings, shafts and frame.

The principal object of the present invention is to provide a balanced pulley body in which an accurately machined shell is intimately frictionally engaged with accurately machined end members to form a rotational driving connection without the use of keying or welding.

Another object is to axially secure the end members to the shell of a pulley body without introducing additional metal such as keys or weld beads.

Another object is to provide removable hubs for a balanced conveyor pulley to adapt the same for use with various styles of shafting.

A further object is to provide a frictionally assembled drive pulley which utilizes the torsional resilience of a considerable length of the drive shaft.

Other objects and advantages will be apparent from a consideration of the following description and drawings in which:

FIG. 1 is a perspective view of a conveyor drive pulley assembly;

FIG. 2 is an elevation view of a drive pulley assembly with the pulley body shown in section;

FIG. 3 is similar to FIG. 2 and shows a pulley body fitted to an alternate style of shaft;

FIG. 4 is a fragmentary elevation view, to enlarged scale, of an alternate form of shell lip;

FIG. 5 is similar to FIG. 4 and shows the lip of FIG. 4 deformed to axially secure an end member to the shell; and FIG. 6 is a fragmentary view to enlarged scale of an alternate form of connection between the drive shaft and end member.

Referring now to FIGS. 1 and 2 of the drawings, the numeral 10 indicates the frame of a belt conveyor to which pillow blocks 11 are fastened by bolts 12. Bearings 13, 13 are secured in pillow block 11 to support the shaft 14 for rotation. Shaft 14 is connected to a source of power, not shown, as by sprocket 16 and key 17. The shaft 14 also supports and drives the pulley body 18 which is covered by lagging 19 for engaging a belt 21.

Pulley body 18 is comprised of a cylindrical shell 22 and end members 23 and 24. In the embodiment shown in FIG. 2, end member 23 is a driving member while member 24 is a supporting member. Shell 22 is accurately internally machined as by boring to provide an inwardly extending inner cylindrical surface 26 which is concentric with the outer periphery of shell 22 about the axis of rotation of the pulley to form an annular end portion 29 at the end of shell 22. As shown in FIG. 2, the inner cylindrical surface 26 may be spaced inwardly from the end of shell 22 to form a circumferential shoulder 27 and a circumferential lip 28. Opposite ends of shell 22 may be formed alike and corresponding portions in FIG. 2 bear the same reference characters with primes affixed. The diameter of surface 26 or 26' is preferably about 1/16 inch larger than the internal diameter of lip 28 or 28'.

End members 23 and 24 have outer peripheral surfaces 31' and 31 respectively which are accurately machined to a diameter larger than the diameter of the corresponding inner cylindrical surface 26 or 26'. The diameter of member 23 or 24 is determined by adding from 0.0005 to 0.001 inch per inch of diameter to the diameter of the corresponding inner surface 26 or 26'.

In order to assemble shell 22 and end members 23 and 24 to form pulley body 18, the shell 22 is expanded to a larger diameter to permit emplacing end members 23 and 24 through lips 28 and 28' against shoulders 27 and 27'. A suitable range of expansion is provided, where the shell 22 is of steel, by heating the shell to a temperature 300 to 500 degrees F. above ambient. After emplacing end members 23 and 24, the assembly is allowed to cool to ambient temperature to provide a "shrink" fit between the end members and shell.

Referring now to FIGS. 4 and 5, an alternate form of lip is shown which is desirable where a greater or "heavier" shrink fit is desired. In the alternate construction shown in FIGS. 4 and 5, the shell is identified by reference character 32. Shell 32 has an inner cylindrical surface 33 extending inwardly from the end of the shell and terminating in a shoulder 38. Greater force can be developed in the shrink fit where it is unnecessary to clear a preformed lip extending toward the axis of the shell. A thin section 36 is formed on the end of shell 32 to provide an annular fin which remains radially outwardly of inner surface 33 until after end member 37 has been assembled. This fin 36 is particularly advantageous in that it readily permits deformation to form lip 39.

Referring again to FIG. 2, the shell 18 is fitted with removable hubs 41 and 42. Hub 41 is shown bolted to supporting end member 24 by bolts 51. An annular face 43 on hub 41 is shown frictionally engaged with support member 24 although such engagement is not required in the embodiment of FIG. 2. A bore 48 in supporting member 24 is radially supported by the surface 44 of hub 41 concentric about the axis of rotation of the pulley. Hub 41 has a straight bore 53 which is radially supported by a straight turned portion of shaft 14 indicated at 54. The fit between surfaces 53 and 54 spaces hub 41 radially concentric about the axis of rotation of the pulley but permits sliding movement in an axial direction. The relative dimensions of surface 54 and bore 53 may be determined in any particular case from tables or formulae for "running" fits or "push" fits available in various manuals of shop practices.

Hub 42 serves a triple purpose in that it radially spaces drive member 23 concentrically about the axis of rotation of the pulley, it secures pulley body 18 axially with respect to shaft 14, and it rotatably drives pulley body 18. In order to form an efficient rotary driving connection, the fit between hub 42 and drive member 23 should provide for maximum frictional contact. Such frictional contact may be provided by face 46 of hub 42 secured to drive member 23 by bolts 52 or it may be provided by a "force" fit or "drive" fit between the surface 47 of hub 42 and bore 49 in drive member 23.

Hub 42 has a tapered or conical bore 56 which is engaged with tapered seat 57 on shaft 14. A threaded portion 58 occurs on shaft 14 immediately adjacent tapered seat 57. A pair of nuts 59 and 61 are engaged with shaft portion 58 one of which bears on hub 42 to securely lock hub 42 and shaft 14 together. The other nut 61 serves to lock bearing nut 59 against rotation. The engagement between tapered bore 56 and tapered seat 57 axially secures hub 42 with respect to shaft 14 and provides a rotational driving fit for transferring power from shaft 14 to pulley body 18. In order to provide the most efficient fit between tapered bore 56 and tapered seat 57 it is essential that hub 41 and support member 24 be axially moveable on shaft 14.

In the embodiment of FIG. 2, power is supplied to shaft 14 at one end by sprocket 16 and is transferred from the shaft to the pulley through hub 42 near the opposite end. Where the intermediate hub 41 does not grip shaft 14, the torsional resilience of the shaft is effectively utilized to ease the shock of starting loads.

FIG. 6 illustrates a modification of shaft and hub where it is desired to drive pulley body 18 from both its ends while retaining the axial locking feature provided by the tapered bore and seat shown in FIG. 2. In this modification the hub and shaft are provided with interengaging splines which permit axial movement but transmit rotational movement.

An alternate style of shaft is shown in FIG. 3 which illustrates a drive pulley having a pulley body 18 connected directly to a drive shaft 62 and support shaft 63. In this embodiment a shaft and corresponding hub form a single unitary part which may be bolted directly to end members 23 or 24.

Although I have shown and described a preferred embodiment of my invention, together with certain modifications thereof, it will be understood that various other modifications may be made without departing from the spirit and scope of the invention as defined by the appended claims.

I claim:

1. A drive pulley for belt conveyors and the like comprising:
    a cylindrical shell rotatable about its central axis;
    an axially extending annular portion formed near one end of said shell defining an axially inwardly extending inner cylindrical surface in said shell;
    a circumferential shoulder in said shell spaced axially inwardly from the end thereof and extending radially toward the axis of said shell defining the inward extent of said annular portion and said inner cylindrical surface;
    a lip on said shell extending axially outwardly from said shoulder beyond said inner cylindrical surface having a portion thereof extending radially toward the axis of said shell;
    a drive member axially secured to said shell between said shoulder and the extending portion of said lip having an outer cylindrical surface frictionally engaged around its perimeter with the said inner cylindrical surface of said shell; and
    drive means connected to said drive member whereby rotary motion is transmitted to said shell by means of frictional engagement of said drive member with said shell along the said inner and outer cylindrical surfaces thereof.

2. A drive pulley for belt conveyors and the like comprising:
    a cylindrical shell rotatable about its central axis;
    an axially extending annular portion formed on each end of said shell defining an axially inwardly extending inner cylindrical surface at each end thereof;
    a support member engaged with one of said inner cylindrical surfaces;
    support means supporting said support member;
    a circumferential shoulder in said shell spaced axially inwardly from an end thereof and extending radially toward the axis of said shell defining the inward extent of the other of said inner cylindrical surfaces;
    a fin extending axially from said shell adjacent the other of said inner cylindrical surfaces, a portion of said fin extending toward the axis of said shell;
    a drive member axially secured to said shell between said shoulder and the extending portion of said fin having an outer cylindrical surface frictionally engaged around its entire perimeter with the said other inner cylindrical surface; and
    drive means connected to said drive member whereby rotary motion is transmitted to said shell by means of frictional engagement between the said other inner cylindrical surface of said shell and the outer cylindrical surface of said drive member.

3. A drive pulley for belt conveyors and the like comprising:
    a cylindrical shell rotatable about its central axis;
    an axially extending annular portion formed on each end of said shell defining an inwardly extending inner cylindrical surface at each end thereof;
    a circular support member engaged with one of said inner cylindrical surfaces;
    a circular drive member having an outer cylindrical surface frictionally engaged around its entire perimeter with the other of said inner cylindrical surfaces; and
    a drive shaft extending along the axis of said shell supporting said support member and drivingly connected to said drive member.

4. A drive pulley for belt conveyors and the like comprising:
    a cylindrical shell rotatable about its central axis;
    an axially extending annular portion formed on each end of said shell defining an inwardly extending inner cylindrical surface at each end thereof;
    a circular support member engaged with one of said inner cylindrical surfaces;
    a circumferential shoulder in said shell spaced axially inwardly from an end thereof and extending radially toward the axis of said shell defining the inward extent of the other of said inner cylindrical surfaces;
    a lip on said shell spaced axially outward from said shoulder along the other said inner cylindrical surface and extending radially toward the axis of said shell;
    a circular drive member axially secured to said shell between said shoulder and said lip having an outer cylindrical surface frictionally engaged around its perimeter with the said other inner cylindrical surface;
    a drive shaft extending through said shell along the axis thereof supporting said support member for relative axial movement with respect thereto; and
    a drive connection drivingly connecting said shaft to said drive member and prohibiting relative axial movement between said shaft and drive member.

5. A drive pulley for belt conveyors and the like comprising:
    a cylindrical shell rotatable about its central axis;
    an axially extending annular portion formed on each end of said shell defining an inwardly extending inner cylindrical surface at each end thereof;
    a circular support member engaged with one of said inner cylindrical surfaces, said support member having a straight bore through the center thereof;
    a circumferential shoulder in said shell spaced axially inwardly from an end thereof and extending radially toward the axis of said shell defining the inward extent of the other of said inner cylindrical surfaces;
    a lip on said shell spaced axially outward from said shoulder along the other said inner cylindrical surface and extending radially toward the axis of said shell;
    a circular drive member axially secured to said shell between said shoulder and said lip having an outer cylindrical surface frictionally engaged around its perimeter with the said other inner cylindrical surface, said drive member having a conical bore through the center thereof;
    a drive shaft extending through said shell along the axis thereof having a tapered seat in interfitting engagement with the conical bore of said drive member and having a portion of said shaft spaced axially from said tapered seat in supporting engagement with said support member permitting relative axial movement between said shaft and said support member.

6. A drive pulley for belt conveyors and the like comprising:

a cylindrical shell rotatable about its central axis;
an axially extending annular portion formed on each end of said shell defining an inwardly extending inner cylindrical surface at each end thereof;
a first circular drive member having an outer cylindrical surface frictionally engaged around its perimeter with one of said inner cylindrical surfaces;
a circumferential shoulder in said shell spaced axially inwardly from an end thereof and extending radially toward the axis of said shell defining the inward extent of the other of said inner cylindrical surfaces;
a lip on said shell spaced axially outward from said shoulder along the other said inner cylindrical surface and extending radially toward the axis of said shell;
a second circular drive member axially secured to said shell between said shoulder and said lip having an outer cylindrical surface frictionally engaged around its perimeter with the said other inner cylindrical surface; and
a drive shaft extending through said first and second drive members along the axis of said shell, one portion of said shaft being drivingly connected to said first drive member to transmit rotary motion while permitting relative axial movement between said shaft and said first member, and another portion of said shaft spaced from said one portion being drivingly connected to said second drive member to transmit rotary motion and prohibit relative axial movement between said shaft and said second drive member.

7. A drive pulley for belt conveyors and the like comprising:

a cylindrical shell rotatable about its central axis;
an axially extending annular portion formed on each end of said shell defining an inwardly extending inner cylindrical surface at each end thereof;
a circular support member engaged with one of said inner cylindrical surfaces and having a straight bored hub bored concentric about the axis of said shell;
a circumferential shoulder in said shell spaced axially inwardly from an end thereof and extending radially toward the axis of said shell defining the inward extent of the other of said inner cylindrical surfaces;
a lip on said shell spaced axially outward from said shoulder along the other said inner cylindrical surface and extending radially toward the axis of said shell;
a circular drive member axially secured to said shell between said shoulder and said lip having an outer cylindrical surface frictionally engaged around its entire perimeter with the said other inner cylindrical surface, and having a conical bored hub bored concentric about the axis of said shell;
an elongated drive shaft extending through said shell along the axis thereof;
a tapered seat on said shaft in interfitting driving engagement with the conical bored hub of said drive member;
a threaded portion on said shaft outwardly adjacent the said tapered seat;
a nut threadably engaged with the threaded portion of said shaft and abutting the hub of said drive member to axially fix said drive member relative to said shaft;
a portion of said shaft spaced axially from said tapered seat in supporting engagement with the straight bored hub of said support member permitting telescopic movement between said shaft and said support member; and
a drive connection on said shaft spaced axially outwardly from said support member and remote from said drive member.

8. A drive pulley for belt conveyors and the like comprising:

a cylindrical shell rotatable about its central axis;
an axially extending annular portion formed on each end of said shell defining an inwardly extending inner cylindrical surface at each end thereof;
a first circular drive member having an outer cylindrical surface frictionally engaged around its perimeter with one of said inner cylindrical surfaces and having an internally splined hub portion concentric about the center thereof;
a circumferential shoulder in said shell spaced axially inwardly from an end thereof and extending radially toward the axis of said shell defining the inward extent of the other of said inner cylindrical surfaces;
a lip on said shell spaced axially outward from said shoulder along the other said inner cylindrical surface and extending radially toward the axis of said shell;
a second circular drive member axially secured to said shell between said shoulder and said lip having an outer cylindrical surface frictionally engaged around its perimeter with the said other inner cylindrical surface; and
a drive shaft extending through said first and second drive members along the axis of said shell, one portion of said shaft having splined engagement with said first drive member permitting relative axial movement between said shaft and said first member, and another portion of said shaft spaced from said one portion being drivingly connected to said second drive member to transmit rotary motion and prohibit relative axial movement between said shaft and said second drive member.

References Cited in the file of this patent

UNITED STATES PATENTS

| | | |
|---|---|---|
| 1,499,920 | Godden | July 1, 1924 |
| 1,716,900 | Rash | June 11, 1929 |
| 1,752,675 | Larson | Apr. 1, 1930 |
| 2,001,736 | Larason | May 21, 1935 |
| 2,704,793 | Hanson | Mar. 22, 1955 |
| 2,736,205 | Dunne | Feb. 28, 1956 |